(12) United States Patent
Murakami et al.

(10) Patent No.: US 12,552,428 B2
(45) Date of Patent: Feb. 17, 2026

(54) TRAIN INFORMATION MANAGEMENT APPARATUS, TRAIN INFORMATION MANAGEMENT SYSTEM, AND TRAIN INFORMATION MANAGEMENT METHOD

(71) Applicant: Mitsubishi Electric Corporation, Tokyo (JP)

(72) Inventors: Tatsuhiko Murakami, Tokyo (JP); Takashi Miyauchi, Tokyo (JP); Shingo Hamada, Tokyo (JP); Ryosuke Okada, Tokyo (JP)

(73) Assignee: MITSUBISHI ELECTRIC CORPORATION

( * ) Notice: Subject to any disclaimer, the term of this patent is extended or adjusted under 35 U.S.C. 154(b) by 34 days.

(21) Appl. No.: 18/835,138

(22) PCT Filed: Mar. 29, 2022

(86) PCT No.: PCT/JP2022/015468
§ 371 (c)(1),
(2) Date: Aug. 1, 2024

(87) PCT Pub. No.: WO2023/187994
PCT Pub. Date: Oct. 5, 2023

(65) Prior Publication Data
US 2025/0242846 A1 Jul. 31, 2025

(51) Int. Cl.
*B61L 25/02* (2006.01)
*B61L 27/70* (2022.01)

(52) U.S. Cl.
CPC ............ *B61L 25/026* (2013.01); *B61L 27/70* (2022.01)

(58) Field of Classification Search
CPC ...... B61L 25/025; B61L 25/026; B61L 27/70; B61L 23/14; B61L 27/0038;
(Continued)

(56) References Cited

U.S. PATENT DOCUMENTS 5,796,613 A * 8/1998 Kato ................. G01C 21/28
701/472
5,911,773 A * 6/1999 Mutsuga .......... G08G 1/096872
340/995.13

(Continued)

FOREIGN PATENT DOCUMENTS

| JP | 2002145070 A | 5/2002 |
| JP | 2003306146 A | 10/2003 |
| WO | 2018109830 A1 | 6/2018 |

OTHER PUBLICATIONS

International Search Report (PCT/ISA/210) with translation and Written Opinion (PCT/ISA/237) mailed on May 17, 2022, by the Japan Patent Office as the International Searching Authority for International Application No. PCT/JP2022/015468. (9 pages).

*Primary Examiner* — Hai H Huynh
*Assistant Examiner* — Johnny H Hoang
(74) *Attorney, Agent, or Firm* — BUCHANAN, INGERSOLL & ROONEY PC

(57) ABSTRACT

A train information management apparatus includes a calculator that calculates a first travel position of a train based on the number of revolutions of wheels of the train, a beacon information receiving unit that receives information from a beacon, an on-board communication unit that communicates with a base station and acquires identification information on the base station, a storage unit that stores, when the train passes over a specific beacon, combined information of information on the specific beacon passed over, the identification information on the base station with which the on-board communication unit communicates, and information on a second travel position of the train, and a correction control unit that corrects the first travel position with the second travel position using the combined information when the train passes over the specific beacon during operation in (Continued)

which the train does not stop at stations at a specified frequency.

14 Claims, 10 Drawing Sheets

(58) Field of Classification Search
CPC ...... B61L 27/0077; B61L 27/20; B61L 27/40; B61L 3/125; B61L 15/0027; Y02T 90/16
See application file for complete search history.

(56) References Cited

U.S. PATENT DOCUMENTS

| | | | |
|---|---|---|---|
| 6,347,280 B1* | 2/2002 | Inoue | G09B 29/10 340/988 |
| 6,415,222 B1* | 7/2002 | Sato | G08G 1/096791 340/995.18 |
| 2013/0173879 A1* | 7/2013 | Suzuki | G08G 1/0112 711/165 |
| 2017/0184403 A1* | 6/2017 | Kumabe | G01S 19/45 |
| 2019/0315382 A1 | 10/2019 | Tokumaru | |
| 2021/0089045 A1* | 3/2021 | Kitano | G05D 1/0238 |
| 2022/0171393 A1* | 6/2022 | Kitano | G05D 1/0212 |

* cited by examiner

TRAIN INFORMATION MANAGEMENT APPARATUS, TRAIN INFORMATION MANAGEMENT SYSTEM, AND TRAIN INFORMATION MANAGEMENT METHOD

FIELD

The present disclosure relates to a train information management apparatus that calculates the travel position of a train, a train information management system, and a train information management method.

BACKGROUND

Conventionally, a train traveling on a track such as rails calculates the travel position of the train by calculating a travel distance corresponding to the number of revolutions of wheels from a starting point position, and notifies a ground apparatus or the like of the travel position of the train. However, if spinning or sliding occurs between the rails and the wheels, an error occurs between the travel distance of the train corresponding to the number of revolutions of the wheels and the actual travel distance of the train. Even during normal travel, errors can occur in the travel distance calculation stage. These errors accumulate and become large as the travel distance of the train increases.

To deal with this problem, Patent Literature 1 discloses a technique in which a train resets a travel distance corresponding to the number of revolutions of wheels every time the train stops at a station while calculating the travel distance, to prevent accumulation of errors between the travel distance of the train corresponding to the number of revolutions of the wheels and the actual travel distance of the train, to reduce errors.

CITATION LIST

Patent Literature

Patent Literature 1: Japanese Patent Application Laid-open No. 2002-145070

SUMMARY OF INVENTION

Problem to be Solved by the Invention

However, according to the above conventional technique, the train in operation without stopping at stations, such as not in service, cannot reset the travel distance. Furthermore, according to the above conventional technique, the train in operation in which the train stops at fewer stations than a train that stops at all stations, like a limited express train, resets the travel distance a fewer number of times. When the train is in such an operation, errors between the travel distance of the train corresponding to the number of revolutions of the wheels and the actual travel distance of the train accumulate.

The longer the travel distance of the train, the larger the accumulation of errors disadvantageously becomes. The present disclosure has been made in view of the above. It is an object of the present disclosure to provide a train information management apparatus that can reduce errors in the travel distance of a train even during operation in which the train does not stop at stations or stops at fewer stations.

Means to Solve the Problem

In order to solve the above problems and to achieve the object, a train information management apparatus according to the present disclosure includes: a calculator to calculate a first travel position of a train based on the number of revolutions of wheels of the train; a beacon information receiving unit to receive information from a beacon; an on-board communication unit to communicate with a base station installed on ground and acquire identification information on the base station; a storage unit to store, when the train passes over a specific beacon that is the beacon specified, combined information of information on the specific beacon passed over, the identification information on the base station with which the on-board communication unit communicates, and information on a second travel position of the train; and a correction control unit to correct the first travel position with the second travel position using the combined information when the train passes over the specific beacon during operation in which the train does not stop at stations at a specified frequency.

Effects of the Invention

The train information management apparatus of the present disclosure has the effect of being able to reduce errors in the travel distance of the train even during operation in which the train does not stop at stations or stops at fewer stations.

DESCRIPTION OF EMBODIMENTS

Hereinafter, a train information management apparatus, a train information management system, and a train information management method according to embodiments of the present disclosure will be described in detail with reference to the drawings.

First Embodiment

Figure 1:
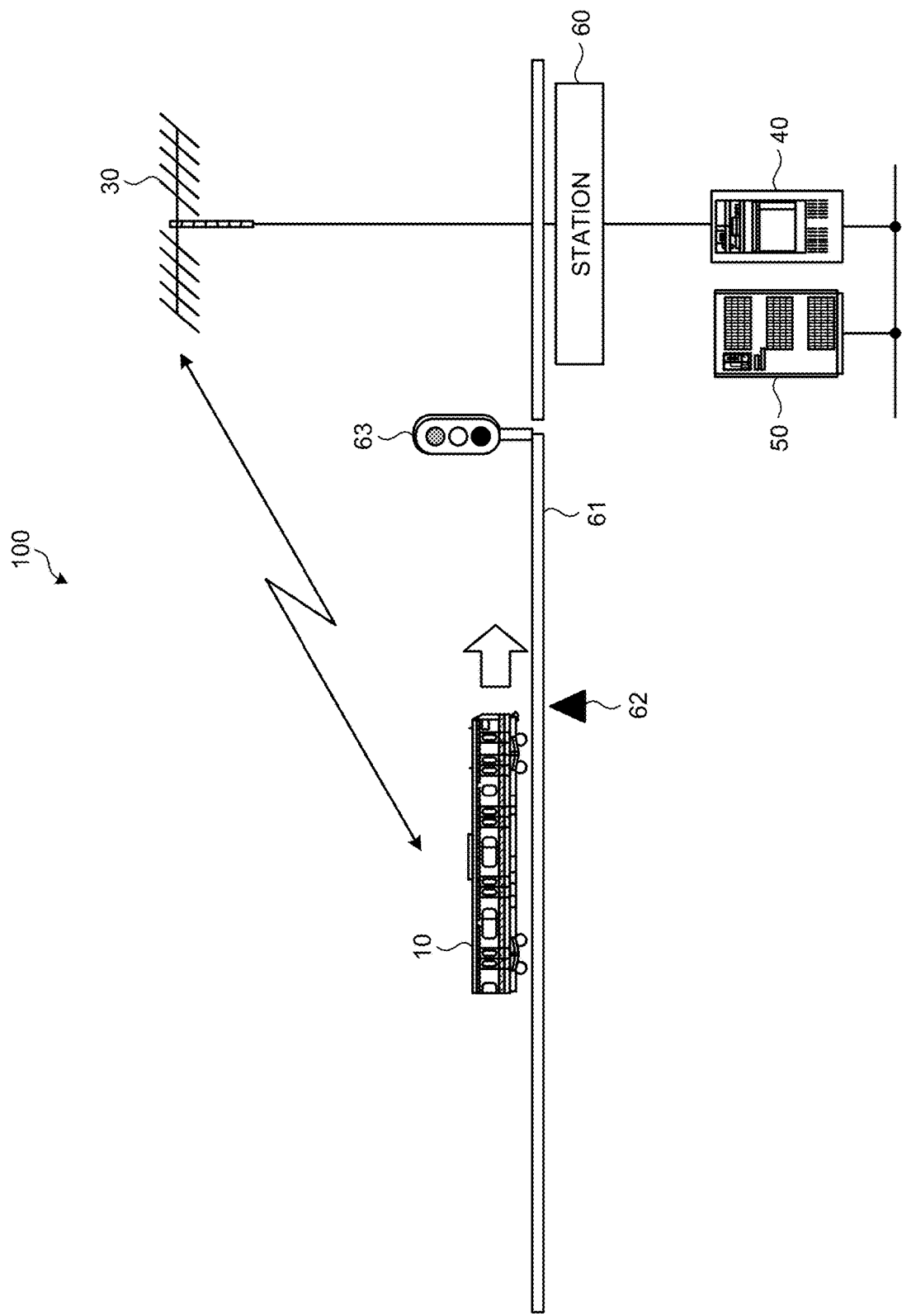
FIG. 1 is a first diagram illustrating an installation example of a train information management system according to a first embodiment.
Figure 2:
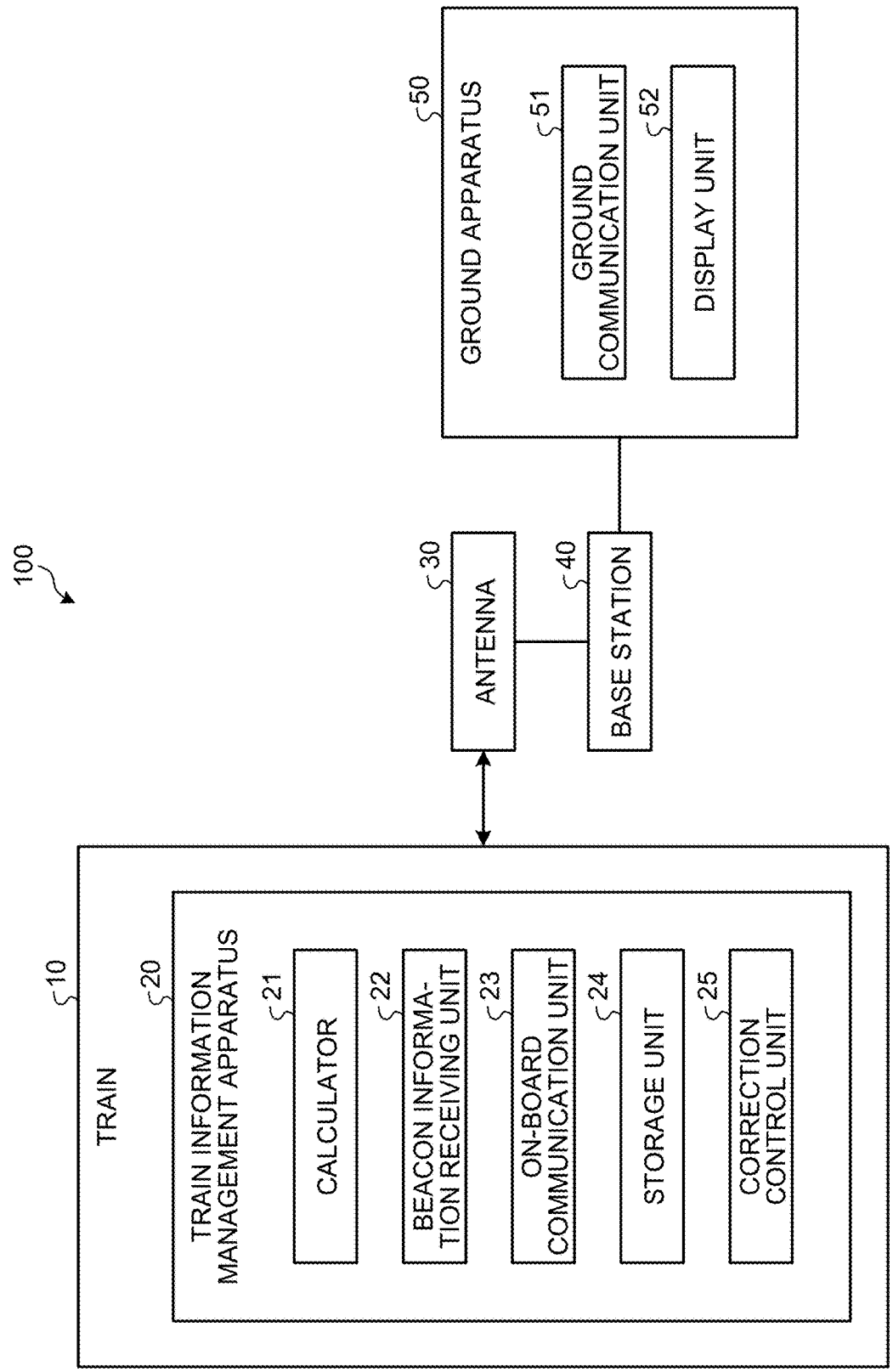
FIG. 2 is a diagram illustrating an exemplary configuration of the train information management system according to the first embodiment.

FIG. 1 is a first diagram illustrating an installation example of a train information management system 100 according to a first embodiment. FIG. 2 is a diagram illustrating an exemplary configuration of the train information management system 100 according to the first embodiment. The train information management system 100 includes a train information management apparatus 20 installed on a train 10 and a ground apparatus 50 installed on the ground.

The train 10 is equipped with the train information management apparatus 20. The train 10 travels from left to right as indicated by an arrow in the example of FIG. 1.

The train information management apparatus 20 calculates the travel position of the train 10. The train information management apparatus 20 transmits the calculated travel position of the train 10 to the ground apparatus 50 via an antenna 30 and a base station 40. For 30 example, a public network can be used for communication between the train information management apparatus 20 and the antenna 30, that is, the base station 40, but the present invention is not limited to this.

The antenna 30 is connected to the base station 40, and transmits and receives signals to and from the train information management apparatus 20 when the base station 40 communicates with the train information management apparatus 20. In the examples of FIGS. 1 and 2, one antenna 30 is connected to the base station 40, but a plurality of antennas 30 may be connected to the base station 40.

The base station 40 communicates with the train information management apparatus 20 via the antenna 30. The base station 40 is connected to the ground apparatus 50 via an Internet line or the like. The base station 40 outputs the travel position of the train 10 acquired from the train information management apparatus 20 via the antenna 30 to the ground apparatus 50. When transmitting control information etc. for the train 10 from the ground apparatus 50 to the train 10, the base station 40 also transmits identification information on the base station 40. Consequently, the train 10 receives the identification information on the base station 40 together with the control information etc. from the ground apparatus 50, and thus can grasp with which base station 40 the train 10 is communicating.

Figure 3:
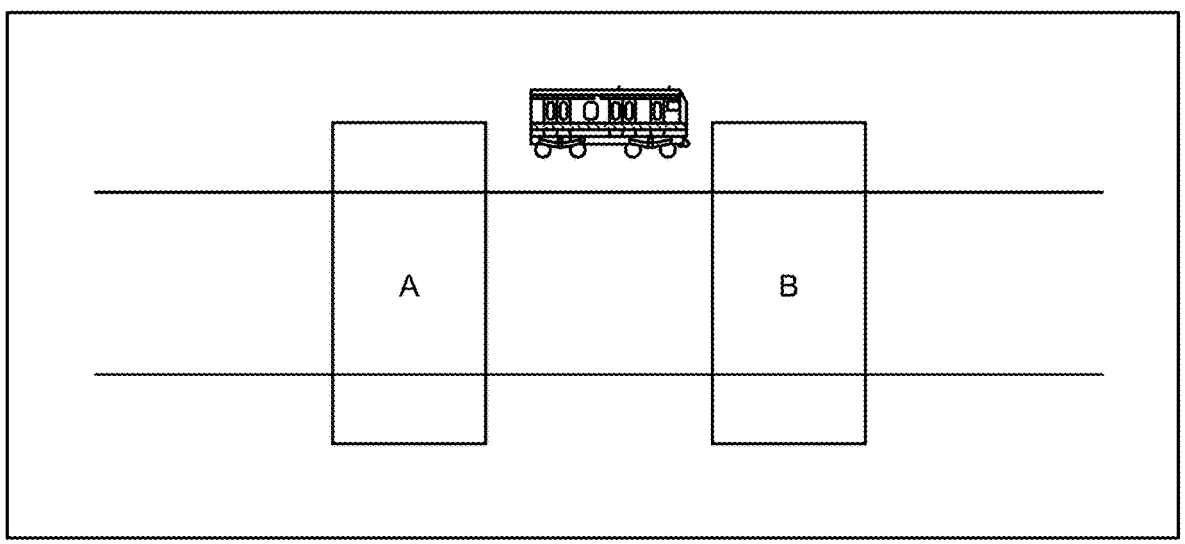
FIG. 3 is a diagram illustrating an example of the display of the travel position of a train by a ground apparatus in the train information management system according to the first embodiment.

The ground apparatus 50 manages the operation of the train 10, based on the travel position of the train 10 acquired via the antenna 30 and the base station 40. The ground apparatus 50 displays the travel position of the train 10, based on the acquired travel position of the train 10. FIG. 3 is a diagram illustrating an example of the display of the travel position of the train 10 by the ground apparatus 50 in the train information management system 100 according to the first embodiment. In the example of FIG. 3, when the train 10 is traveling from left to right, the ground apparatus 50 displays the fact that the train 10 is traveling between a station A and a station B, that is, the train 10 is traveling from the station A toward the station B. In the examples of FIGS. 1 and 2, the ground apparatus 50 manages the operation of one train 10, but the present invention is not limited to this. The ground apparatus 50 can manage the operation of a plurality of trains 10. The ground apparatus 50 can display the plurality of trains 10 on a display screen as illustrated in FIG. 3. In the examples of FIGS. 1 and 2, the ground apparatus 50 is connected to one base station 40, but the ground apparatus 50 can be connected to a plurality of base stations 40 depending on a control area in which the ground apparatus 50 manages the operation of the train 10.

A station 60 is a place at which the train 10 can stop. Although one station 60 is shown in the example of FIG. 1, there is actually a plurality of stations 60 at which the train 10 can stop. Here, in general, a plurality of block sections is provided for the station 60, and a signal and a plurality of beacons are installed in each block section. The block sections are referred to as a first block, a second block, . . . , in order of proximity to the station 60 in the travel direction of the train 10. The beacons are referred to as a first beacon, a second beacon, . . . , in order of proximity to the station 60 in each block section. The example of FIG. 1 illustrates a first block 61, a second beacon 62 in the first block 61, and a signal 63 in the first block 61. The beacons including the second beacon 62 in the first block 61 are, for example, existing beacons used in an automatic train stop system-pattern (ATS-P), but are not limited to these.

Figure 4:
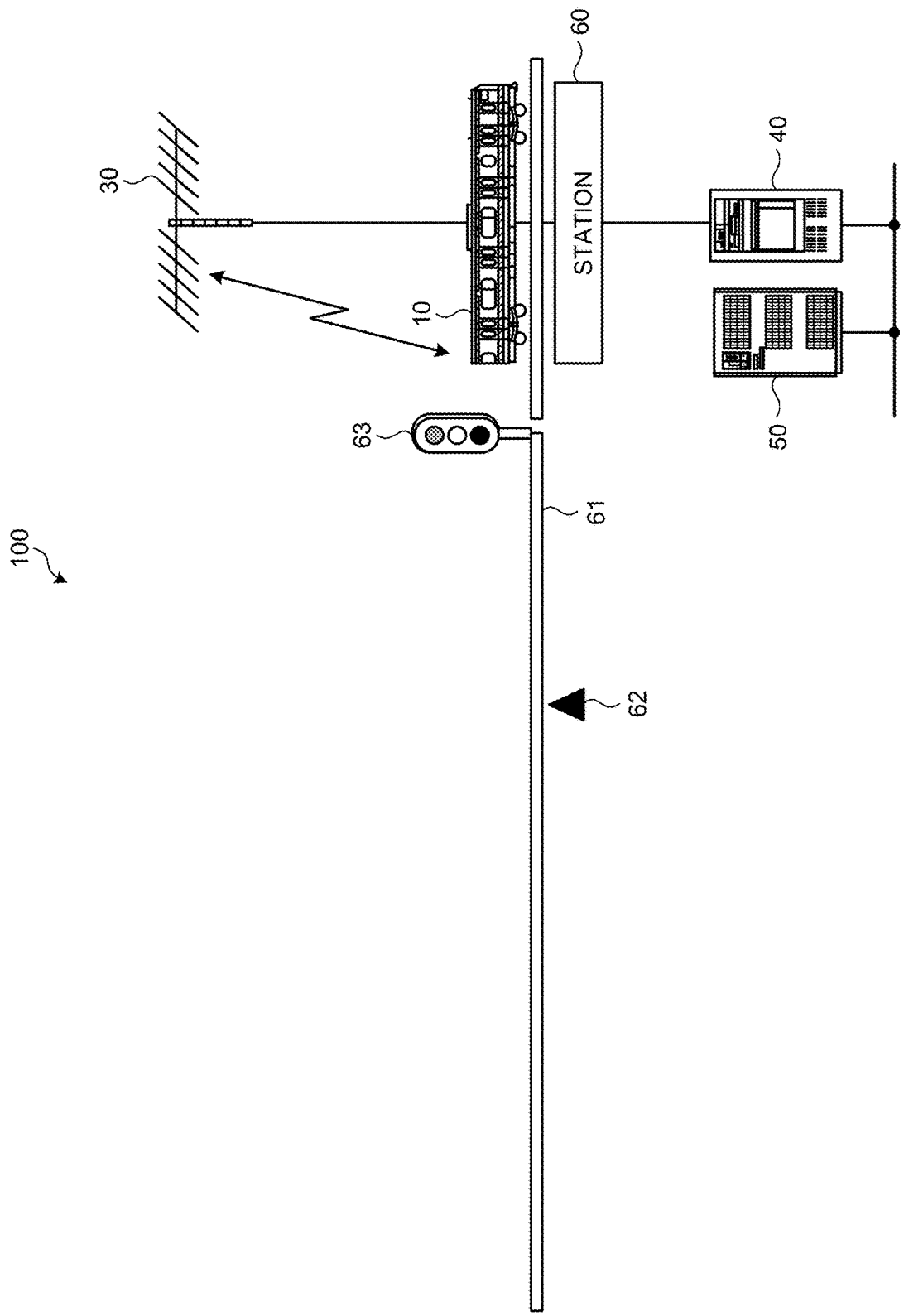
FIG. 4 is a second diagram illustrating the installation example of the train information management system according to the first embodiment.

In the present embodiment, the train information management apparatus 20 installed on the train 10 corrects the calculated travel position of the train 10, based on position information on the station 60 during operation in which the train 10 stops at the stations 60 at a specified frequency. Since the position of the station 60 is fixed, the train information management apparatus 20 corrects the travel position of the train 10, using the position information on the station 60 that is a travel position from a starting point set in advance with respect to the station 60. The position information on the station 60 is, for example, the absolute kilometrage of a stopping target value of the train 10 at the station 60. The train information management apparatus 20 may store the position information on the station 60 in advance, or may acquire the position information on the station 60 from the ground apparatus 50 via the antenna 30 and the base station 40. FIG. 4 is a second diagram illustrating the installation example of the train information management system 100 according to the first embodiment. The difference from FIG. 1 is that the train 10 is stopped at the station 60 in FIG. 4. Using, for example, the fact that the train 10 is stopped at the station 60 and the doors of the train 10 are opened as a trigger, the train information management apparatus 20 of the train 10 corrects the travel position of the train 10, based on the position information on the station 60.

When the train 10 in operation in which the train 10 stops at the stations 60 at the specified frequency passes over the second beacon 62 in the first block 61, the train information management apparatus 20 installed on the train 10 stores combined information of information on the second beacon 62 passed over, the identification information on the base station 40 with which the train information management apparatus 20 communicates, and information on the travel position of the train 10. Then, the train information management apparatus 20 installed on the train 10 corrects the calculated travel position of the train 10 using the stored combined information during operation in which the train 10 does not stop at the stations 60 at the specified frequency.

Here, when the train 10 is in operation in which the train 10 stops at the stations 60 at the specified frequency, the train 10 is operated as a service type train. When the train 10 is operated as a service type train, the train 10 is operated, for example, as a local train, a rapid train, or the like. When the train 10 is in operation in which the train 10 stops at the stations 60 at the specified frequency, the train 10 may not stop at some stations 60 like a rapid train or the like. When the train 10 is in operation in which the train 10 does not stop at the stations 60 at the specified frequency, the train 10 is operated, for example, as a non-service type train. When the train 10 is operated as a non-service type train, the train 10 is traveling without carrying passengers, for example, as an out-of-service train or the like. In the present embodiment, operation in which the train 10 does not stop at the stations 60 at the specified frequency may include a freight train that does not carry passengers, a limited express train that may stop at stations 60 but stops at fewer stations 60, a group train that stops only at specific stations 60, etc. As a method to determine whether the train 10 is in operation in which the train 10 stops at the stations 60 at the specified frequency or in operation in which the train 10 does not stop at the stations 60 at the specified frequency, it is also possible to determine that the train 10 is in operation in which the train 10 stops at the stations 60 at the specified frequency when the train 10 stops at a specified percentage of the stations 60 with respect to the number of the stations 60 provided on the travel route.

Next, the configuration and operation of the train information management apparatus 20 will be described in detail. As illustrated in FIG. 2, the train information management apparatus 20 includes a calculator 21, a beacon information receiving unit 22, an on-board communication unit 23, a storage unit 24, and a correction control unit 25.

The calculator 21 calculates the travel position of the train 10, based on the number of revolutions of wheels of the train 10. For example, the calculator 21 can calculate the travel position of the train 10 by calculating a travel distance of the train 10, based on pulse information obtained from a tachometer generator installed on the train 10, and adding the calculated travel distance to a starting point position. A method of calculating the travel position of the train 10 in the calculator 21 may be a typical method, and thus is not limited to a particular one. In the following description, the travel position of the train 10 calculated by the calculator 21 is sometimes referred to as a first travel position.

The beacon information receiving unit 22 receives information from the beacons via a pickup coil or the like (not illustrated). In the example of FIG. 1, the beacon information receiving unit 22 receives a message including information such as a number indicating the second beacon 62 in the first block 61 from the second beacon 62 in the first block 61. The first beacon (not illustrated) in the first block 61 is installed near the signal 63. A message from the first beacon in the first block 61 may change in content depending on an indication of the signal 63. On the other hand, the message from the second beacon 62 in the first block 61 is a message with many fixed areas. Here, the first block 61 is provided not only for the station 60 illustrated in FIG. 1 but also for the other stations 60 at which the train 10 can stop. The second beacon 62 in the first block 61 is also installed in front of the other stations 60. The number indicating the second beacon 62 in the first block 61 is not unique to the second beacon 62 in the first block 61 installed for each station 60, and is assumed to be a common number.

The on-board communication unit 23 transmits information on the travel position of the train 10 etc. to the ground apparatus 50 via the antenna 30 and the base station 40, and receives control information etc. from the ground apparatus 50. At this time, the on-board communication unit 23 communicates with the base station 40 installed on the ground, and acquires the identification information on the base station 40.

When the train 10 passes over a specific beacon that is a specified beacon, the storage unit 24 stores combined information of information on the specific beacon passed over, the identification information on the base station 40 with which the on-board communication unit 23 communicates, and information on the travel position of the train 10. Here, a specific beacon that is a specified beacon is a specified number beacon counting from a beacon closest to the station 60 in a specified block section provided for each station 60 at which the train 10 can stop. In the present embodiment, the specific beacon is the second beacon 62 in the first block 61. The information on the specific beacon is the number indicating the second beacon 62 in the first block 61 described above. That is, when the train 10 passes over the second beacon 62 in the first block 61, the storage unit 24 stores combined information of the number indicating the second beacon 62 in the first block 61, the identification information on the base station 40 with which the on-board communication unit 23 communicates, and the information on the travel position of the train 10 that has been calculated by the calculator 21. Here, it is conceivable that the train information management apparatus 20 may communicate with two or more base stations 40 when the train 10 passes over the second beacon 62 in the first block 61. Therefore, the storage unit 24 may store identification information on a plurality of base stations 40 for one specific beacon as combined information. The storage unit 24 stores these pieces of information, that is, the combined information under the control of the correction control unit 25. In the following description, the travel position of the train 10 stored in the storage unit 24 is sometimes referred to as a second travel position.

When the train 10 passes over a specific beacon that is a specified beacon, the correction control unit 25 stores, in the storage unit 24, combined information of information on the specific beacon passed over, the identification information on the base station 40 with which the on-board communication unit 23 communicates, and information on the travel position of the train 10. When the train 10 passes over the specific beacon during operation in which the train 10 does not stop at the stations 60 at the specified frequency, the correction control unit 25 corrects the first travel position, which is the travel position of the train 10 calculated by the calculator 21, with the second travel position, which is the travel position of the train 10 stored in the storage unit 24, using the combined information stored in the storage unit 24, based on the identification information on the base station 40 with which the on-board communication unit 23 communicates. The correction control unit 25 performs control to transmit information on the corrected first travel position to the ground apparatus 50 that manages the operation of the train 10 via the on-board communication unit 23.

In the present embodiment, during operation in which the train 10 stops at the stations 60 at the specified frequency, the correction control unit 25 newly acquires or updates combined information to be stored in the storage unit 24 and stores the combined information in the storage unit 24 while correcting the first travel position, which is the travel position of the train 10 calculated by the calculator 21, every time the train 10 stops at one of the stations 60, based on the position information on the station 60. During operation in which the train 10 does not stop at the stations 60 at the specified frequency, the correction control unit 25 corrects the first travel position, which is the travel position of the train 10 calculated by the calculator 21, using the combined information stored in the storage unit 24. When the train 10 is in operation in which the train 10 stops at the stations 60 at the specified frequency, the train 10 is operated as a service type train, and the train 10 is operated as a local train, a rapid train, or the like as described above. When the train 10 is in operation in which the train 10 does not stop at the stations 60 at the specified frequency, the train 10 is operated as a non-service type train, and the train 10 is operated as an out-of-service train or the like as described above. Operation in which the train 10 does not stop at the stations 60 at the specified frequency may include operation in which the train 10 is operated as a freight train, a limited express train, a group train, or the like.

In the present embodiment, the correction control unit 25 can estimate the approximate travel position of the train 10, using the identification information on the base station 40, utilizing the fact that the identification information on each base station 40 is unique to the base station 40. However, one base station 40 covers a wide communication area. Therefore, the correction control unit 25 identifies a position in the communication area of the base station 40 by a position at which a message is received from the second beacon 62 in the first block 61. Then, the correction control unit 25 stores, in the storage unit 24, a combination of pieces of information that are the information on the specific beacon included in the message received from the second beacon 62 in the first block 61, the identification information on the base station 40, and the travel position of the train 10 calculated by the calculator 21 at this time. Thus, the correction control unit 25 stores in advance the combined information as described above for the second beacon 62 in the first block 61 provided for each station 60 in the storage unit 24 so that the travel position of the train 10 can be corrected, using the same number of pieces of combined information as the number of the stations 60.

Here, the train information management apparatus 20 communicates with the base station 40 via the antenna 30. It is assumed that the base station 40 is not the property of a railroad company that operates the train 10 but the property of a communications company. Therefore, regardless of the intentions of the railroad company, the base station 40 with which the train information management apparatus 20 communicates may be changed due to replacement of the base station 40 or addition of a base station 40, for example. In such a case, when the train 10 passes over the second beacon 62 in the first block 61 in front of a certain station 60, the identification information on the base station 40 with which the train information management apparatus 20 communicates does not match the identification information on the base station 40 stored in the storage unit 24 by the train information management apparatus 20. That is, during operation in which the train 10 does not stop at the stations 60 at the specified frequency, the train information management apparatus 20 cannot correct the first travel position, which is the travel position of the train 10 calculated by the calculator 21, using the combined information stored in the storage unit 24. Therefore, in the present embodiment, the correction control unit 25 updates the combined information stored in the storage unit 24 at specified intervals. The specified intervals are, for example, every day. For example, when the first operation for the day of the train 10 equipped with the train information management apparatus 20 is as a local train, the correction control unit 25 updates the combined information stored in the storage unit 24 during a period in which the train 10 is operated as the local train.

Figure 5:
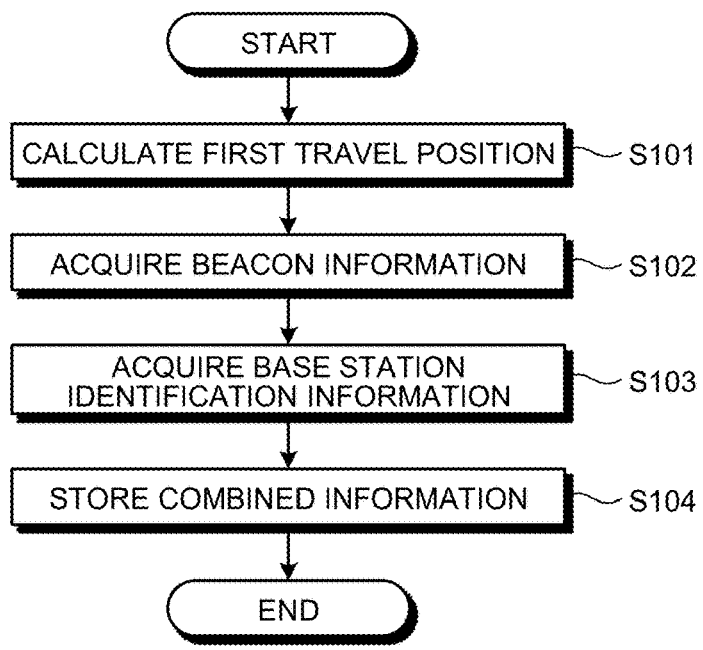
FIG. 5 is a first flowchart illustrating the operation of a train information management apparatus according to the first embodiment.

The operation of the train information management apparatus 20 will be described with reference to a flowchart. FIG. 5 is a first flowchart illustrating the operation of the train information management apparatus 20 according to the first embodiment. In the train information management apparatus 20, the calculator 21 calculates the first travel position of the train 10 based on the number of revolutions of the wheels of the train 10 (step S101). The beacon information receiving unit 22 acquires information from a beacon (step S102). The on-board communication unit 23 communicates with the base station 40 and acquires the identification information on the base station 40 (step S103). When the train 10 passes over a specific beacon that is a specified beacon, the correction control unit 25 stores, in the storage unit 24, combined information of information on the specific beacon passed over, the identification information on the base station 40 with which the on-board communication unit 23 communicates, and information on the second travel position of the train 10 (step S104).

Figure 6:
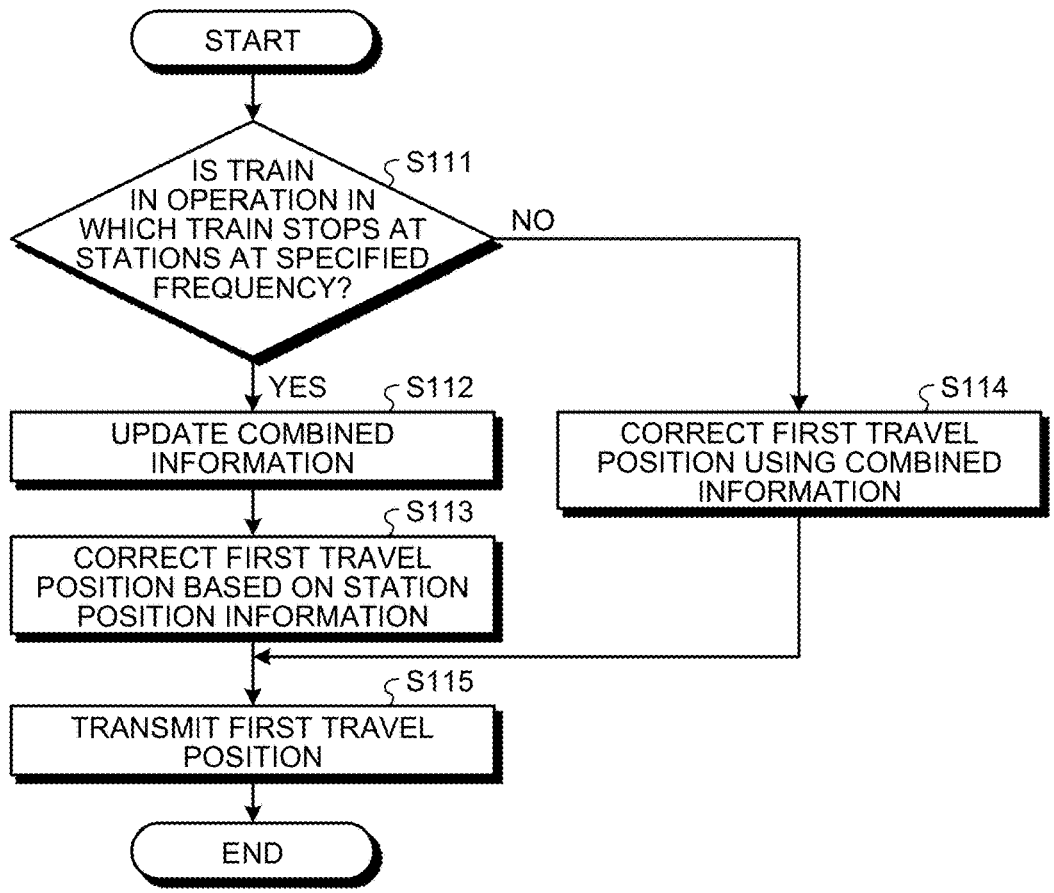
FIG. 6 is a second flowchart illustrating the operation of the train information management apparatus according to the first embodiment.

FIG. 6 is a second flowchart illustrating the operation of the train information management apparatus 20 according to the first embodiment. In the train information management apparatus 20, when the train 10 is in operation in which the train 10 stops at the stations 60 at the specified frequency (step S111: Yes), the correction control unit 25 updates the combined information stored in the storage unit 24 (step S112). When the train 10 is stopped at a station 60, the correction control unit 25 corrects the first travel position, which is the travel position of the train 10 calculated by the calculator 21, based on the position information on the station 60 (step S113). When the train 10 is in operation in which the train 10 does not stop at the stations 60 at the specified frequency (step S111: No), the correction control unit 25 corrects the first travel position, which is the travel position of the train 10 calculated by the calculator 21, using the combined information stored in the storage unit 24 (step S114). After step S113 or step S114, the on-board communication unit 23 transmits the corrected first travel position to the ground apparatus 50 under the control of the correction control unit 25 (step S115).

In the present embodiment, when the train 10 is in operation in which the train 10 does not stop at the stations 60 at the specified frequency, the train information management apparatus 20 corrects the first travel position, which is the travel position of the train 10 calculated by the calculator 21, using the combined information, but the present invention is not limited to this. In a case where the train 10 is in operation in which the train 10 stops at fewer stations 60 like a limited express train, when the train 10 is stopped at a station 60, the train information management apparatus 20 may correct the first travel position, which is the travel position of the train 10 calculated by the calculator 21, based on the position information on the station 60. That is, during operation in which the train 10 does not stop at the stations 60 at the specified frequency, if the train information management apparatus 20 can perform the correction operation that is performed during operation in which the train 10 stops at the stations 60 at the specified frequency, the train information management apparatus 20 may use the correction operation in combination.

As information included in the combined information, the present embodiment uses the information on a specific beacon that is a specified beacon passed over, the identification information on the base station 40 with which the on-board communication unit 23 communicates, and the information on the travel position of the train 10, when the train 10 passes over the specific beacon. However, the present invention is not limited to this. For example, information such as the travel direction of the train 10 may be included in the combined information.

In the present embodiment, the specific beacon is the second beacon 62 in the first block 61, but is not limited to this. The specific beacon may be, for example, the second beacon in the second block (not illustrated). Furthermore, the specific beacon is not limited to one beacon. A plurality of beacons may be used as specific beacons.

Next, the configuration and operation of the ground apparatus 50 will be described. As illustrated in FIG. 2, the ground apparatus 50 includes a ground communication unit 51 and a display unit 52.

The ground communication unit 51 communicates with the train information management apparatus 20 via the base station 40 and the antenna 30, and acquires information on a corrected first travel position that is the travel position of the train 10 calculated by the calculator 21 and corrected by the correction control unit 25 in the train information management apparatus 20.

The display unit 52 displays the corrected first travel position acquired by the ground communication unit 51. As illustrated in FIG. 3, the display unit 52 displays which stations 60 the train 10 is traveling between, or which station 60 the train 10 is stopped at.

Figure 7:
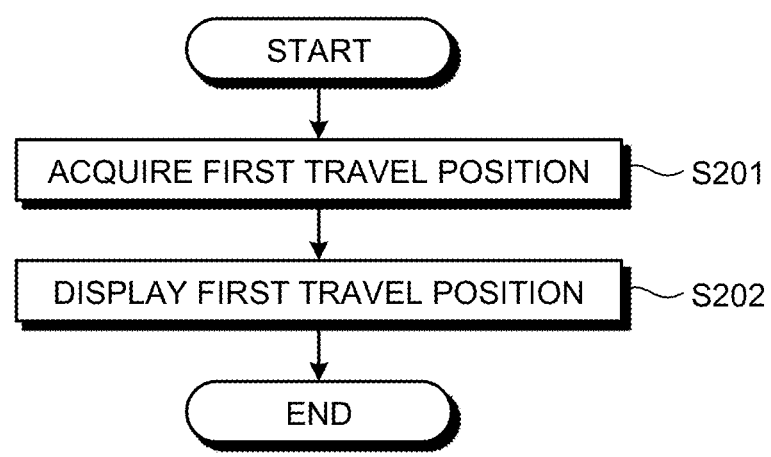
FIG. 7 is a flowchart illustrating the operation of the ground apparatus according to the first embodiment.

The operation of the ground apparatus 50 will be described with reference to a flowchart. FIG. 7 is a flowchart illustrating the operation of the ground apparatus 50 according to the first embodiment. In the ground apparatus 50, the ground communication unit 51 communicates with the train information management apparatus 20 via the antenna 30 and the base station 40, and acquires the corrected first travel position from the train information management apparatus 20 (step S201). The display unit 52 displays the corrected first travel position (step S202).

Next, a hardware configuration of the train information management apparatus 20 according to the first embodiment will be described. In the train information management apparatus 20, the beacon information receiving unit 22 is a communication device that can receive messages from the beacons. The on-board communication unit 23 is a communication device that can communicate with the base station 40. The storage unit 24 is memory. The calculator 21 and the correction control unit 25 are implemented by processing circuitry. The processing circuitry may be memory storing a program and a processor that executes the program stored in the memory, or may be dedicated hardware. The processing circuitry is also referred to as a control circuit.

Figure 8:
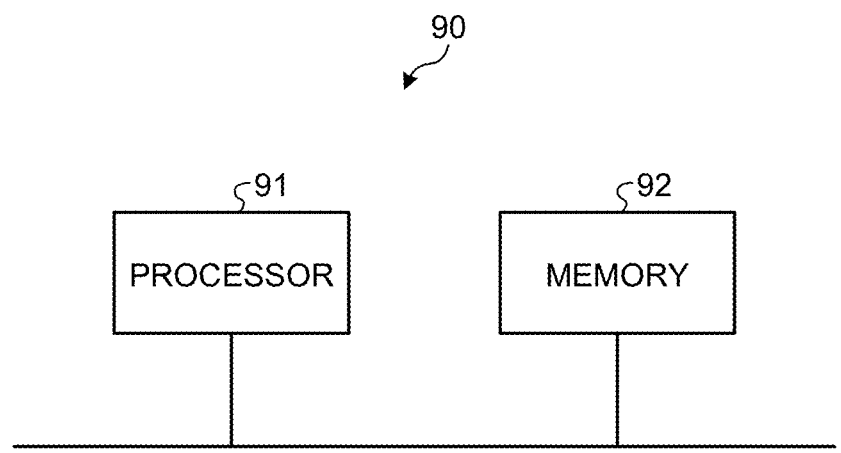
FIG. 8 is a diagram illustrating an example of a configuration of processing circuitry when processing circuitry of the train information management apparatus according to the first embodiment is implemented by a processor and memory.

FIG. 8 is a diagram illustrating an example of a configuration of processing circuitry 90 when processing circuitry of the train information management apparatus 20 according to the first embodiment is implemented by a processor 91 and memory 92. The processing circuitry 90 illustrated in FIG. 8 is a control circuit and includes the processor 91 and the memory 92. When the processor 91 and the memory 92 constitute the processing circuitry 90, functions of the processing circuitry 90 are implemented by software, firmware, or a combination of software and firmware. The software or firmware is described as a program and stored in the memory 92. In the processing circuitry 90, the processor 91 reads and executes the program stored in the memory 92, thereby implementing the functions. That is, the processing circuitry 90 includes the memory 92 for storing the program that results in the execution of the processing in the train information management apparatus 20. This program can be said to be a program to cause the train information management apparatus 20 to perform the functions implemented by the processing circuitry 90. This program may be provided via a storage medium on which the program is stored, or may be provided via another means such as a communication medium.

The above program can be said to be a program to cause the train information management apparatus 20 to perform: a first step in which the calculator 21 calculates the first travel position of the train 10 based on the number of revolutions of the wheels of the train 10; a second step in which the beacon information receiving unit 22 receives information from a beacon; a third step in which the on-board communication unit 23 communicates with the base station 40 installed on the ground and acquires the identification information on the base station 40; and a fourth step in which the correction control unit 25 stores, when the train 10 passes over a specific beacon that is a specified beacon, combined information of information on the specific beacon passed over, the identification information on the base station 40 that the on-board communication unit 23 communicates with, and information on the second travel position of the train 10 in the storage unit 24, and during operation in which the train 10 does not stop at the stations 60 at the specified frequency, the correction control unit 25 corrects the first travel position with the second travel position using the combined information when the train 10 passes over the specific beacon.

Here, the processor 91 is, for example, a central processing unit (CPU), a processing device, an arithmetic device, a microprocessor, a microcomputer, a digital signal processor (DSP), or the like. The memory 92 corresponds, for example, to nonvolatile or volatile semiconductor memory such as random access memory (RAM), read only memory (ROM), flash memory, an erasable programmable ROM (EPROM), or an electrically EPROM (EEPROM) (registered trademark), or a magnetic disk, a flexible disk, an optical disk, a compact disc, a mini disc, a digital versatile disc (DVD), or the like.

Figure 9:
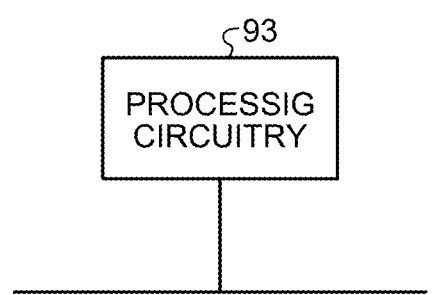
FIG. 9 is a diagram illustrating an example of a configuration of processing circuitry when the processing circuitry of the train information management apparatus according to the first embodiment is implemented by dedicated hardware.

FIG. 9 is a diagram illustrating an example of a configuration of processing circuitry 93 when the processing circuitry of the train information management apparatus 20 according to the first embodiment is implemented by dedicated hardware. The processing circuitry 93 illustrated in FIG. 9 corresponds, for example, to a single circuit, a combined circuit, a programmed processor, a parallel-programmed processor, an application specific integrated circuit (ASIC), a field programmable gate array (FPGA), or a combination of these. The processing circuitry 93 may be implemented partly by dedicated hardware and partly by software or firmware. Thus, the processing circuitry 93 can implement the above-described functions by dedicated hardware, software, firmware, or a combination of these.

A hardware configuration of the ground apparatus 50 will be described. In the ground apparatus 50, the ground communication unit 51 is a communication device that can communicate with the base station 40. The display unit 52 is a display that displays the travel position of the train 10 etc. using a liquid crystal display (LCD) or the like.

As described above, according to the present embodiment, the train information management apparatus 20 stores, when the train 10 passes over a specific beacon that is a specified beacon, combined information of information on the specific beacon passed over, the identification information on the base station 40 with which the on-board communication unit 23 communicates, and information on the travel position of the train 10. When the train 10 passes over the specific beacon during operation in which the train 10 does not stop at the stations 60 at the specified frequency, the train information management apparatus 20 corrects the first travel position, which is the travel position of the train 10 calculated by the calculator 21, with the second travel position, which is the travel position of the train 10 stored in the storage unit 24, using the combined information stored in the storage unit 24, based on the identification information on the base station 40 with which the on-board communication unit 23 communicates. Consequently, the train information management apparatus 20 can reduce errors in the travel distance of the train 10 even during operation in which the train 10 does not stop at the stations 60 or stops at fewer stations 60.

Furthermore, even during operation in which the train 10 does not stop at the stations 60 or stops at fewer stations 60, the ground apparatus 50 can accurately display the travel position of the train 10 by acquiring the corrected travel position from the train 10.

Second Embodiment

In the first embodiment, it is assumed that operation of a service type train such as a local train is performed first in order for the train information management apparatus 20 to obtain combined information to be stored in the storage unit 24. A second embodiment describes a case where the train information management apparatus 20 installed on a train acquires combined information obtained by the train information management apparatus 20 installed on another train via a ground apparatus.

Figure 10:
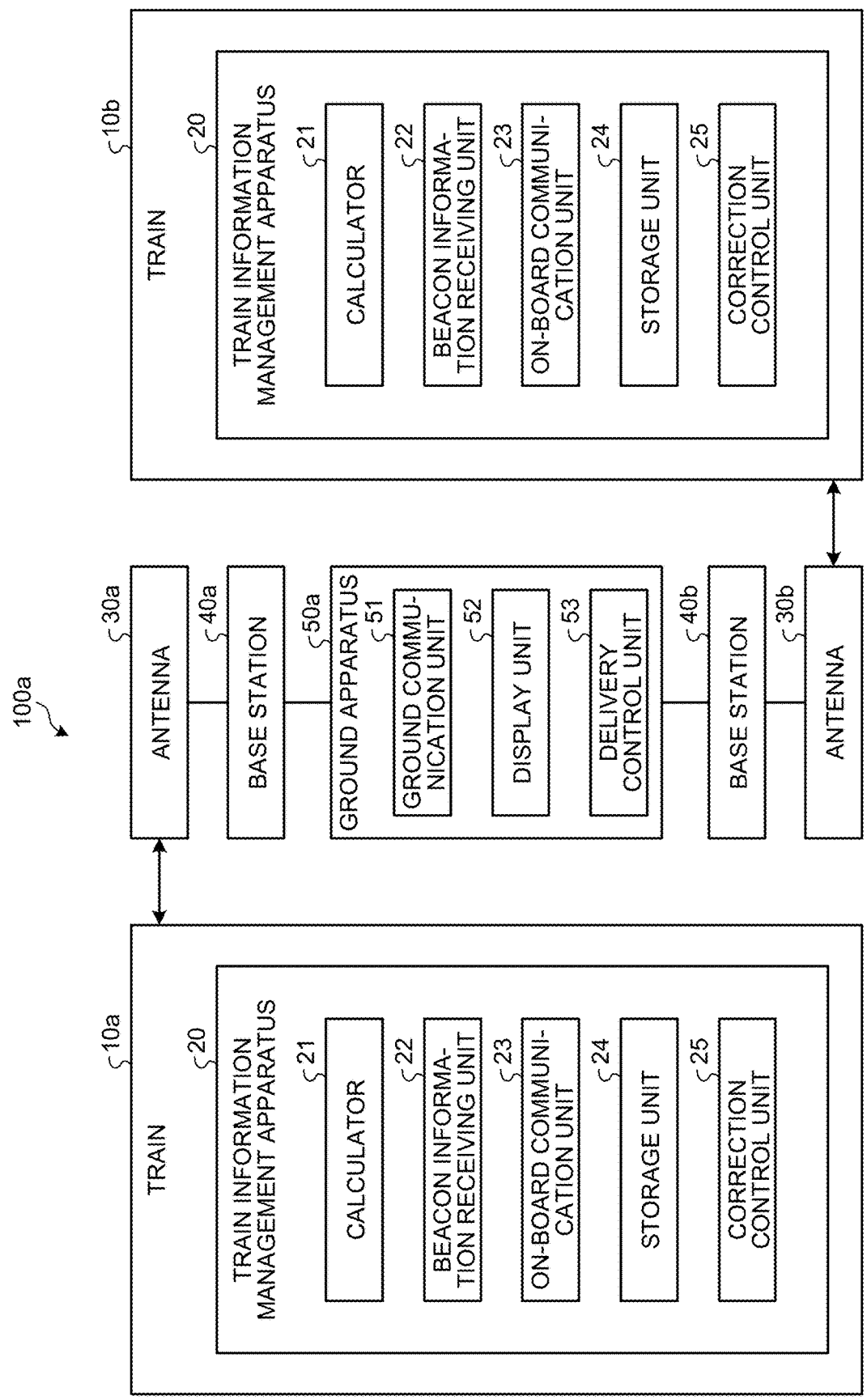
FIG. 10 is a diagram illustrating an exemplary configuration of a train information management system according to a second embodiment.

FIG. 10 is a diagram illustrating an exemplary configuration of a train information management system 100a according to the second embodiment. The train information management system 100a includes the train information management apparatus 20 installed on a train 10a, the train information management apparatus 20 installed on a train 10b, and a ground apparatus 50a installed on the ground. The configuration of the train information management apparatuses 20 installed on the trains 10a and 10b illustrated in FIG. 10 is the same as the configuration of the train information management apparatus 20 installed on the train 10 of the first embodiment illustrated in FIG. 2. In the following description, the train 10a is sometimes referred to as a first train, and the train 10b as a second train.

The ground apparatus 50a includes the ground communication unit 51, the display unit 52, and a delivery control unit 53. The ground apparatus 50a is obtained by adding the delivery control unit 53 to the ground apparatus 50 of the first embodiment illustrated in FIG. 2. The delivery control unit 53 performs control to deliver combined information.

In the present embodiment, during operation in which the train 10a stops at the stations 60 at a specified frequency, the correction control unit 25 of the train information management apparatus 20 installed on the train 10a newly acquires or updates combined information to be stored in the storage unit 24 and stores the combined information in the storage unit 24 while correcting a first travel position that is the travel position of the train 10a calculated by the calculator 21 every time the train 10a stops at one of the stations 60, based on position information on the station 60, and further performs control to transmit the combined information stored in the storage unit 24 to the ground apparatus 50a via the on-board communication unit 23. During operation in which the train 10a does not stop at the stations 60 at the specified frequency, the correction control unit 25 of the train information management apparatus 20 installed on the train 10a corrects the first travel position, which is the travel position of the train 10a calculated by the calculator 21, using the combined information stored in the storage unit 24.

The ground communication unit 51 of the ground apparatus 50a acquires the combined information from the train information management apparatus 20 of the train 10a via an antenna 30a and a base station 40a. The delivery control unit 53 performs control to deliver the combined information acquired by the ground communication unit 51 from the ground communication unit 51. The ground communication unit 51 delivers the combined information to the train information management apparatus 20 installed on the train 10b via a base station 40b and an antenna 30b.

The correction control unit 25 of the train information management apparatus 20 installed on the train 10b acquires the combined information obtained on the train 10a from the ground apparatus 50a via the on-board communication unit 23 and stores the combined information in the storage unit 24, and corrects a first travel position that is the travel position of the train 10b calculated by the calculator 21, using the combined information stored in the storage unit 24 during operation in which the train 10b does not stop at the stations 60 at the specified frequency.

Figure 11:
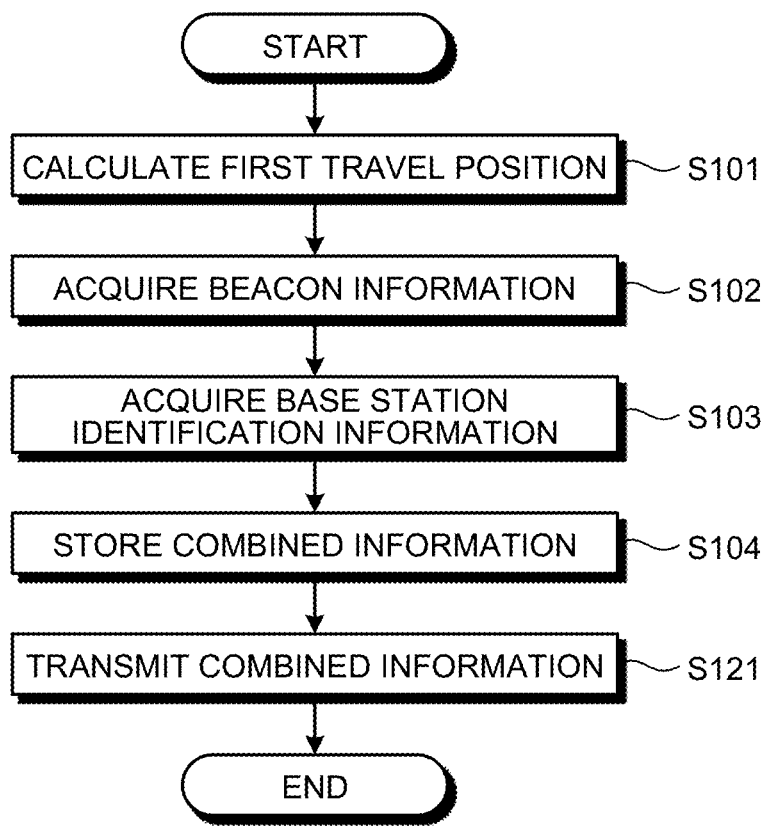
FIG. 11 is a flowchart illustrating the operation of a train information management apparatus installed on a train 10*a* according to the second embodiment.

FIG. 11 is a flowchart illustrating the operation of the train information management apparatus 20 installed on the train 10a according to the second embodiment. The operation up to step S104 is the same as the operation of the train information management apparatus 20 of the first embodiment illustrated in FIG. 5. In the train information management apparatus 20 installed on the train 10a, the on-board communication unit 23 transmits the combined information stored in the storage unit 24 to the ground apparatus 50a under the control of the correction control unit 25 (step S121). The subsequent operation of the train information management apparatus 20 installed on the train 10a is the same as the operation of the train information management apparatus 20 of the first embodiment illustrated in the flowchart of FIG. 6.

Figure 12:
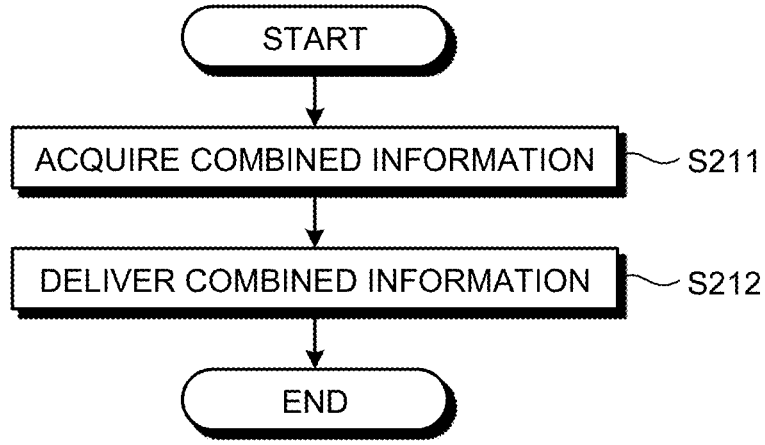
FIG. 12 is a flowchart illustrating the operation of a ground apparatus according to the second embodiment.

FIG. 12 is a flowchart illustrating the operation of the ground apparatus 50a according to the second embodiment. In the ground apparatus 50a, the ground communication unit 51 acquires the combined information from the train information management apparatus 20 installed on the train 10a (step S211). The ground communication unit 51 delivers the combined information to the train information management apparatus 20 installed on the train 10b under the control of the delivery control unit 53 (step S212). The ground apparatus 50a performs the same operation as that of the ground apparatus 50 of the first embodiment illustrated in the flowchart of FIG. 7, in addition to the operation of the flowchart illustrated in FIG. 12.

Figure 13:
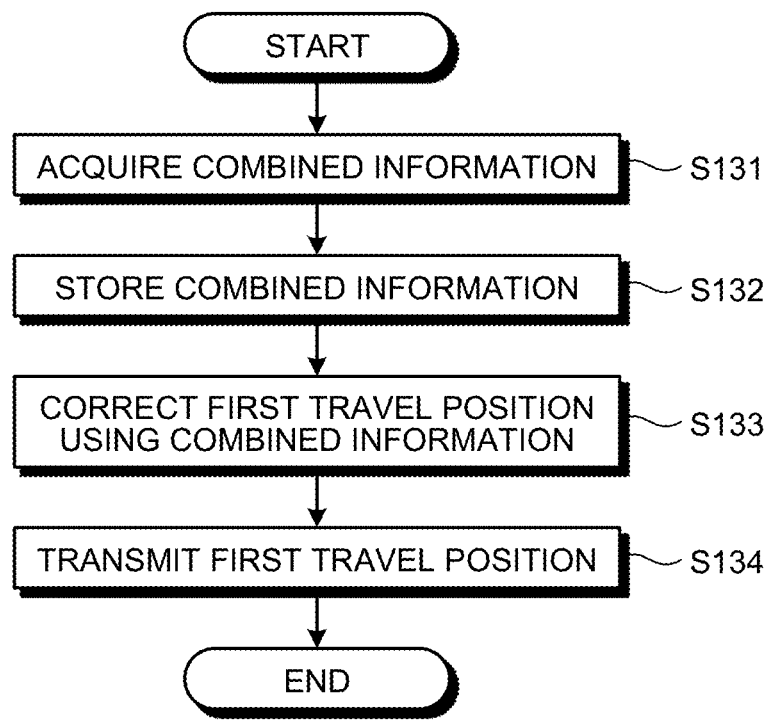
FIG. 13 is a flowchart illustrating the operation of a train information management apparatus installed on a train 10b according to the second embodiment.

FIG. 13 is a flowchart illustrating the operation of the train information management apparatus 20 installed on the train 10b according to the second embodiment. In the train information management apparatus 20 installed on the train 10b, the on-board communication unit 23 acquires the combined information obtained on the train 10a from the ground apparatus 50a via the base station 40b and the antenna 30b (step S131). The correction control unit 25 stores the combined information acquired by the on-board communication unit 23 in the storage unit 24 (step S132). During operation in which the train 10b does not stop at the stations 60 at the specified frequency, the correction control unit 25 corrects the first travel position, which is the travel position of the train 10b calculated by the calculator 21, using the combined information (step S133). The on-board communication unit 23 transmits the corrected first travel position to the ground apparatus 50a under the control of the correction control unit 25 (step S134).

The present embodiment has described a case where the ground apparatus 50a delivers the combined information obtained by the train information management apparatus 20 installed on the train 10a to the train information management apparatus 20 installed on the train 10b. However, the destination of the delivery by the ground apparatus 50a is not limited to one train information management apparatus 20. The ground apparatus 50a may deliver the combined information obtained by the train information management apparatus 20 installed on the train 10a to the train information management apparatuses 20 installed on a plurality of the trains 10b. In a case where a plurality of the trains 10a is operated to travel on their respective travel sections into which a route is divided, the delivery control unit 53 of the ground apparatus 50a may perform control to acquire combined information on the individual travel sections from the individual train information management apparatuses 20 installed on the plurality of trains 10a, combine the combined information on the individual travel sections to generate combined information on the entire route, and deliver the generated combined information on the entire route.

In the example of FIG. 10, when the ground apparatus 50a delivers the combined information to the train information management apparatus 20 installed on the train 10b, the ground apparatus 50a uses the base station 40b different from the base station 40a used when the combined information is acquired from the train information management apparatus 20 installed on the train 10a, but the present invention is not limited to this. For example, when the positions of the trains 10a and 10b are close to each other, the ground apparatus 50a may deliver the combined information to the train information management apparatus 20 installed on the train 10b, using the same base station 40a as the base station 40a used when the combined information has been acquired from the train information management apparatus 20 installed on the train 10a.

A hardware configuration of the ground apparatus 50a will be described. In the ground apparatus 50a, the ground communication unit 51 is a communication device that can communicate with the base stations 40a and 40b. The display unit 52 is a display that displays the travel positions of the trains 10a and 10b etc. using an LCD or the like. The delivery control unit 53 is implemented by a processing circuit. The processing circuit may be memory storing a program and a processor that executes the program stored in the memory, or may be dedicated hardware. The processing circuit is also referred to as a control circuit.

As described above, according to the present embodiment, the train information management apparatus 20 installed on the train 10b can acquire combined information obtained by the train information management apparatus 20 installed on the other train 10a from the train information management apparatus 20 installed on the other train 10a, and use the combined information to correct the travel position of the train 10b. Consequently, when the train 10b is operated as a freight train, a limited express train, or the like, the train information management apparatus 20 installed on the train 10b can correct the travel position of the train 10b by acquiring combined information from the train information management apparatus 20 installed on the train 10a that is operated as a local train or the like, without the train 10b traveling on a scheduled travel route before actual operation and acquiring combined information. A railroad company that operates the trains 10a and 10b and others does not need to run the train 10b for the purpose of acquiring combined information, and thus can efficiently operate the trains 10a and 10b.

The configurations described in the above embodiments illustrate an example, and can be combined with another known art. The embodiments can be combined with each other. The configurations can be partly omitted or changed without departing from the gist.

REFERENCE SIGNS LIST 10, 10a, 10b train; 20 train information management apparatus; 21 calculator; 22 beacon information receiving unit; 23 on-board communication unit; 24 storage unit; 25 correction control unit; 30, 30a, 30b antenna; 40, 40a, 40b base station; 50, 50a ground apparatus; 51 ground communication unit; 52 display unit; 53 delivery control unit; 60 station; 61 first block; 62 second beacon; 63 signal; 100, 100a train information management system.

The invention claimed is:

1. A train information management apparatus, comprising:
    a calculator to calculate a first travel position of a train based on the number of revolutions of wheels of the train;
    a beacon information receiving circuitry to receive information from a beacon;
    an on-board communication circuitry to communicate with a base station installed on ground and acquire identification information on the base station;
    a storage circuitry to store, when the train passes over a specific beacon that is the beacon specified, combined information of information on the specific beacon passed over, the identification information on the base station with which the on-board communication circuitry communicates, and information on a second travel position of the train; and
    a correction control circuitry to correct the first travel position with the second travel position using the combined information when the train passes over the specific beacon during operation in which the train does not stop at stations at a specified frequency and cannot reset the travel distance.

2. The train information management apparatus according to claim 1, wherein
    the specific beacon in a specified block section provided for each station at which the train can stop is a specified number beacon counting from a beacon closest to the station, and
    during operation in which the train stops at the stations at the specified frequency, the correction control circuitry newly acquires or updates the combined information and stores the combined information in the storage circuitry while correcting the first travel position every time the train stops at one of the stations, based on position information on the station, and during operation in which the train does not stop at the stations at the specified frequency, the correction control circuitry corrects the first travel position using the combined information.

3. The train information management apparatus according to claim 2, wherein
    the correction control circuitry further performs control to transmit the combined information to a ground apparatus that manages operation of the train via the on-board communication circuitry during operation in which the train stops at the stations at the specified frequency.

4. The train information management apparatus according to claim 1, wherein
the specific beacon in a specified block section provided for each station at which the train can stop is a specified number beacon counting from a beacon closest to the station, and
the correction control circuitry acquires the combined information obtained on another train from a ground apparatus that manages operation of the train via the on-board communication circuitry and stores the combined information in the storage circuitry, and corrects the first travel position using the combined information during operation in which the train does not stop at the stations at the specified frequency.

5. The train information management apparatus according to claim 1, wherein
the correction control circuitry updates the combined information stored in the storage circuitry at specified intervals.

6. The train information management apparatus according to claim 1, wherein
the correction control circuitry performs control to transmit information on the corrected first travel position to a ground apparatus that manages operation of the train via the on-board communication circuitry.

7. A train information management system, comprising:
a train information management apparatus to calculate a travel position of a train; and
a ground apparatus to manage operation of the train,
the train information management apparatus, including:
a calculator to calculate a first travel position of the train based on the number of revolutions of wheels of the train;
a beacon information receiving circuitry to receive information from a beacon;
an on-board communication circuitry to communicate with a base station installed on ground and acquire identification information on the base station;
a storage circuitry to store, when the train passes over a specific beacon that is the beacon specified, combined information of information on the specific beacon passed over, the identification information on the base station with which the on-board communication circuitry communicates, and information on a second travel position of the train; and
a correction control circuitry to correct the first travel position with the second travel position using the combined information when the train passes over the specific beacon during operation in which the train does not stop at stations at a specified frequency and cannot reset the travel distance, and perform control to transmit the corrected first travel position to the ground apparatus via the on-board communication circuitry,
the ground apparatus, including:
a ground communication circuitry to communicate with the train information management apparatus via the base station and acquire information on the corrected first travel position; and
a display circuitry to display the corrected first travel position.

8. The train information management system according to claim 7, wherein
the specific beacon in a specified block section provided for each station at which the train can stop is a specified number beacon counting from a beacon closest to the station, a first train and a second train are each equipped with the train information management apparatus,
the ground apparatus further includes a delivery control circuitry to perform control to deliver the combined information,
during operation in which the first train stops at the stations at the specified frequency, the correction control circuitry of the train information management apparatus installed on the first train newly acquires or updates the combined information and stores the combined information in the storage circuitry while correcting the first travel position every time the first train stops at one of the stations, based on position information on the station, and further performs control to transmit the combined information to the ground apparatus via the on-board communication circuitry, and during operation in which the first train does not stop at the stations at the specified frequency, the correction control circuitry of the train information management apparatus installed on the first train corrects the first travel position using the combined information,
the delivery control circuitry of the ground apparatus performs control to deliver the combined information from the train information management apparatus of the first train acquired by the ground communication circuitry from the ground communication circuitry to the train information management apparatus installed on the second train, and
the correction control circuitry of the train information management apparatus installed on the second train acquires the combined information obtained on the first train from the ground apparatus via the on-board communication circuitry and stores the combined information in the storage circuitry, and corrects the first travel position using the combined information during operation in which the second train does not stop at the stations at the specified frequency.

9. A train information management method for a train information management apparatus, the method comprising:
calculating, by a calculator, a first travel position of a train based on the number of revolutions of wheels of the train;
receiving, by a beacon information receiving circuitry, information from a beacon;
communicating, by an on-board communication circuitry, with a base station installed on ground and acquiring, by the on-board communication circuitry, identification information on the base station; and
storing, by a correction control circuitry, when the train passes over a specific beacon that is the beacon specified, combined information of information on the specific beacon passed over, the identification information on the base station with which the on-board communication circuitry communicates, and information on a second travel position of the train in a storage circuitry, and correcting, by the correction control circuitry, the first travel position with the second travel position using the combined information when the train passes over the specific beacon during operation in which the train does not stop at stations at a specified frequency and cannot reset the travel distance.

10. The train information management method according to claim 9, wherein
the specific beacon in a specified block section provided for each station at which the train can stop is a specified number beacon counting from a beacon closest to the station, and in correcting the first travel position, during operation in which the train stops at the stations at the specified frequency, the correction control circuitry newly acquires or updates the combined information and stores the combined information in the storage circuitry while correcting the first travel position every time the train stops at one of the stations, based on position information on the station, and during operation in which the train does not stop at the stations at the specified frequency, the correction control circuitry corrects the first travel position using the combined information.

11. The train information management method according to claim 10, wherein in correcting the first travel position, during operation in which the train stops at the stations at the specified frequency, the correction control circuitry further performs control to transmit the combined information to a ground apparatus that manages operation of the train via the on-board communication circuitry.

12. The train information management method according to claim 9, wherein the specific beacon in a specified block section provided for each station at which the train can stop is a specified number beacon counting from a beacon closest to the station, and in correcting the first travel position, the correction control circuitry acquires the combined information obtained on another train from a ground apparatus that manages operation of the train via the on-board communication circuitry and stores the combined information in the storage circuitry, and corrects the first travel position using the combined information during operation in which the train does not stop at the stations at the specified frequency.

13. The train information management method according to claim 9, wherein in correcting the first travel position, the correction control circuitry updates the combined information stored in the storage circuitry at specified intervals.

14. The train information management method according to claim 9, wherein in correcting the first travel position, the correction control circuitry performs control to transmit information on the corrected first travel position to a ground apparatus that manages operation of the train via the on-board communication circuitry.

* * * * *